US009617713B2

(12) United States Patent
Take et al.

(10) Patent No.: US 9,617,713 B2
(45) Date of Patent: Apr. 11, 2017

(54) CONTROL DEVICE FOR AN ELECTRIC ACTUATOR

(75) Inventors: Hiroaki Take, Hiratsuka (JP); Tadashi Kawaguchi, Hiratsuka (JP); Jun Morinaga, Yokohama (JP)

(73) Assignee: Komatsu Ltd., Minato-ku (JP)

( * ) Notice: Subject to any disclaimer, the term of this patent is extended or adjusted under 35 U.S.C. 154(b) by 582 days.

(21) Appl. No.: 13/583,972

(22) PCT Filed: May 11, 2011

(86) PCT No.: PCT/JP2011/060808
§ 371 (c)(1), (2), (4) Date: Nov. 26, 2012

(87) PCT Pub. No.: WO2011/145488
PCT Pub. Date: Nov. 24, 2011

(65) Prior Publication Data
US 2013/0073111 A1 Mar. 21, 2013

(30) Foreign Application Priority Data
May 20, 2010 (JP) ................................ 2010-116791

(51) Int. Cl.
*G05D 1/02* (2006.01)
*E02F 9/12* (2006.01)
(Continued)

(52) U.S. Cl.
CPC ............ *E02F 9/123* (2013.01); *E02F 9/2095* (2013.01); *E02F 9/2221* (2013.01);
(Continued)

(58) Field of Classification Search
CPC ....... E02F 9/123; E02F 9/2221; E02F 9/2095; F15B 2211/275; F15B 2211/20553;
(Continued)

(56) References Cited

U.S. PATENT DOCUMENTS 3,675,421 A * 7/1972 Asmus .................... F16H 61/40 60/465
3,865,207 A * 2/1975 Schwab ............... B60K 17/356 180/21
(Continued)

FOREIGN PATENT DOCUMENTS

CN 1289392 A 3/2001
CN 1668815 A 9/2005
(Continued)

OTHER PUBLICATIONS

Notice of Reason(s) for Rejection dated Mar. 12, 2013, from Japanese Application No. JP2010-116791, including English translation, 8 pages.
(Continued)

*Primary Examiner* — Robert Fennema
*Assistant Examiner* — Thomas Stevens
(74) *Attorney, Agent, or Firm* — Fish & Richardson P.C.

(57) ABSTRACT

A control device of an electric actuator adapted to perform a forward-reverse movement includes a control unit adapted to be operated in a forward direction or a reverse direction in accordance with the forward-reverse movement of the electric actuator. It also includes a pilot circuit, which is connected to the control unit and which generates a forward pilot pressure or a reverse pilot pressure in accordance with the forward operation or the reverse operation of the control unit. The control device has a differential pressure acquiring unit that acquires a differential pressure between a pilot pressure corresponding to an operation direction of the control unit and a pilot pressure, in a direction opposite to the operation direction, and it has a control command generator that generates a control command for controlling the electric actuator based on the differential pressure acquired by the differential pressure acquiring unit. The control device includes a drive controller for controlling a
(Continued)

drive of the electric actuator based on the generated control command.

5 Claims, 7 Drawing Sheets

(51) Int. Cl.
*E02F 9/20* (2006.01)
*E02F 9/22* (2006.01)
*F16D 31/02* (2006.01)

(52) U.S. Cl.
CPC ............... *F15B 2211/20553* (2013.01); *F15B 2211/275* (2013.01); *F15B 2211/50527* (2013.01); *F15B 2211/6316* (2013.01); *F15B 2211/7058* (2013.01)

(58) Field of Classification Search
CPC ...... F15B 2211/7058; F15B 2211/6316; F15B 2211/50527
USPC ............................................ 700/301; 60/431
See application file for complete search history.

(56) References Cited

U.S. PATENT DOCUMENTS 4,484,655 A * 11/1984 Sheppard, Sr. ........ B60K 17/10 180/305
5,348,115 A * 9/1994 Devier ................. B60K 17/356 180/176
5,638,677 A * 6/1997 Hosono ................. E02F 9/2235 60/431
6,282,892 B1 * 9/2001 Arai ................................ 60/450
6,339,929 B1 1/2002 Udagawa et al.
6,474,063 B2 * 11/2002 Sawada et al. ................. 60/426
8,479,898 B2 * 7/2013 Kodaka ................ B60G 17/005 188/265
2002/0125052 A1 * 9/2002 Naruse et al. ............... 180/53.8
2004/0088103 A1 * 5/2004 Itow et al. .................... 701/110
2004/0209718 A1 * 10/2004 Ishibashi ............. B60W 10/103 474/18
2006/0042129 A1 3/2006 Satake et al.
2006/0046888 A1 * 3/2006 Puiu .............................. 475/151
2006/0237958 A1 * 10/2006 Dix ....................... E02F 9/2203 280/764.1
2007/0125226 A1 6/2007 Komiyama et al.
2007/0214782 A1 * 9/2007 Komiyama et al. ............ 60/431
2007/0229007 A1 * 10/2007 Morinaga ..................... 318/268
2007/0277986 A1 * 12/2007 Morinaga et al. ............ 172/438
2009/0215375 A1 * 8/2009 Hagensen ............. F23L 17/005 454/42
2010/0115938 A1 5/2010 Kobata
2010/0186713 A1 * 7/2010 Kawaguchi et al. ......... 123/350
2011/0240146 A1 * 10/2011 Kawasaki et al. ......... 137/487.5
2011/0271669 A1 * 11/2011 Kawasaki et al. .............. 60/414
2012/0304635 A1 * 12/2012 Ooi et al. ........................ 60/431

FOREIGN PATENT DOCUMENTS

CN 101657646 A 2/2010
EP 1788160 A2 12/2013
JP S56-042704 A 4/1981
JP S56-090158 A 7/1981
JP S57-110860 A 7/1982
JP S57-184749 A 11/1982
JP S58-072506 U 5/1983
JP S59-183562 U 12/1984
JP 09-310379 A 12/1997
JP 2005-290674 A 10/2005
JP 2007-139146 A 6/2007
JP 2007-192151 A 8/2007
JP 2008063888 A 3/2008
JP 2008-248545 A 10/2008
JP 04163137 B2 10/2008
JP 2009-133161 A 6/2009
WO 2010-137506 A1 12/2010

OTHER PUBLICATIONS

International Search Report mailed Jun. 14, 2011 in International Application No. PCT/JP2011/060808, 4 pages.
Office Action issued Apr. 25, 2014 in corresponding Chinese Patent Application No. 201180013882.X, including English translation, 9 pages.
Office Action issued Aug. 6, 2015 for corresponding German Patent Application No. 112011101713.8, 7 pages.

* cited by examiner

CONTROL DEVICE FOR AN ELECTRIC ACTUATOR

CROSS-REFERENCE TO RELATED APPLICATIONS

This application claims priority to Application No. PCT/JP2011/060808, filed May 11, 2011, which application claims priority to Japanese Application No. 2010-116791, filed on May 20, 2010. The contents of the above applications are incorporated herein by reference in their entireties.

TECHNICAL FIELD

The present invention relates to a control device of an electric actuator.

BACKGROUND ART

There has been recently developed a hybrid electric rotary excavator of which rotary body is driven by an electric actuator such as an electric motor while a work equipment and a carriage thereof are driven by a hydraulic actuator.

Since the rotation of the rotary body of such an electric rotary excavator is effected by the electric actuator, even when the rotary body is rotated while a boom and an arm that are hydraulically driven are moved up and down, the rotation of the rotary body is hardly affected by the up-down movement of the boom and the arm. Thus, as compared to a conventional excavator of which rotary body is hydraulically driven, the loss in the control valve and the like can be reduced to enhance the energy efficiency.

Since most of the operators are accustomed to an operation of the conventional excavator of which rotary body is hydraulically driven, the operators may feel uncomfortable during operation due to the behavior of such an electric rotary excavator different from the rotary action of the conventional excavator. Accordingly, there is a demand for providing an excavator that provides similar operation feeling irrespective of the difference in the drive system of the rotary body (i.e. electric drive or hydraulic drive).

In view of the above, an electric rotary excavator has been proposed, in which a torque current command corresponding to a operation amount of a control lever in operating the control lever is generated, a correction torque current command corresponding to the operation amount of the control lever and a rotary speed of the rotary body is generated, and a drive command is generated based on the correction torque current command in order to bring the operation feeling closer to that of a hydraulically driven excavator (see, for instance, Patent Literature 1).

In another excavator, a redundant control command is generated upon operating a rotation control lever of an electric rotary excavator to appropriately control an operation of a rotary body (see, for instance, Patent Literature 2).

CITATION LIST

Patent Literatures

Patent Literature 1 JP-A-2009-133161
Patent Literature 2 JP-A-2008-248545

SUMMARY OF THE INVENTION

Problems to be Solved by the Invention

However, the techniques disclosed in these literatures still do not bring the operation feeling of the electric rotary excavators sufficiently close to that of a conventional hydraulically driven rotary excavator.

Specifically, in the conventional hydraulically driven rotary excavator, when the excavator is rotated, for instance, rightward, a right PPC (Pressure Proportional Control) pressure (i.e. pilot pressure) generated in accordance with an inclination of a control lever is opposed to a left PPC pressure in a rotary spool (i.e. rightward versus leftward). In other words, a force for moving the rotary spool by the right PPC pressure generated in rightward turning is affected by the left PPC pressure (back pressure) in the opposite direction and the difference is transferred to a control valve as an output PPC pressure.

In contrast, since a rotation of an electric rotary excavator is effected by an electric actuator independent of a hydraulic actuator (i.e. without using the rotary spool), when only the right PPC pressure is detected by a pressure sensor to generate a control command, the resultant operation feeling becomes completely different from that of a conventional hydraulically driven rotary excavator.

In addition, a rotary movement of a hydraulically driven rotary excavator becomes slower than usual in a low temperature environment in accordance with increase in a viscosity of hydraulic oil. However, when a control command is generated only by detecting the right PPC pressure by a pressure sensor, since the rotary movement becomes faster than expected, an operator feels greatly uncomfortable for the operation feeling.

The above disadvantages are not limited to an electric rotary excavator but also similarly occur in a hybrid work equipment that, for instance, a boom or an arm is driven by an electric actuator and the rest of operations are hydraulically effected.

An object of the invention is to provide a control device of an electric actuator that is adapted to provide the same operation feeling as the operation feeling of a conventional hydraulically driven work equipment in a hybrid work equipment in which a part of operations is performed by an electric actuator.

Means for Solving the Problems

A control device of an electric actuator according to a first aspect of the invention is for an electric actuator that is adapted to perform a forward-reverse movement, the control device including: a control unit that is adapted to be operated in a forward direction or a reverse direction in accordance with the forward-reverse movement of the electric actuator; a pilot circuit that is connected with the control unit, the pilot circuit generating a forward pilot pressure or a reverse pilot pressure in accordance with the forward operation or the reverse operation of the control unit; a differential pressure acquiring unit that acquires a differential pressure between a pilot pressure corresponding to a operation direction of the control unit and a pilot pressure in a direction opposite to the operation direction; a control command generator that generates a control command to the electric actuator based on the differential pressure acquired by the differential pressure acquiring unit; and a drive controller that controls a drive of the electric actuator based on the control command generated by the control command generator.

A control device according to a second aspect of the invention is the control device according to the first aspect of the invention, in which the differential pressure acquiring unit includes: a forward pressure detector that detects the forward pilot pressure of the pilot circuit; a reverse pressure detector that detects the reverse pilot pressure of the pilot circuit; and a differential pressure calculating section that calculates a differential pressure between the forward pilot pressure detected by the forward pressure detector and the reverse pilot pressure detected by the reverse pressure detector.

Advantage(s) of the Invention

According to the control device of an electric actuator according to the first aspect of the invention, with the differential pressure acquiring unit and the control command generator being provided, the control command is generated from the difference between the forward pilot pressure and the reverse pilot pressure to control the drive of the electric actuator. Accordingly, the electric actuator can be driven while reflecting the influence of the back pressure generated in the direction opposite to the operation direction of the control unit, so that the same operational feeling as that of the conventional hydraulic drive can be provided.

According to the control device of an electric actuator according to the second aspect of the invention, since the differential pressure acquiring unit includes the forward pressure detector and the reverse pressure detector, the forward pilot pressure and the reverse pilot pressure in accordance with the operation direction of the control unit can be detected and the differential pressure can be easily calculated by the differential pressure calculating unit. Thus, the control device can be easily embodied in a control device (e.g. an inverter) for controlling an electric actuator.

DESCRIPTION OF EMBODIMENT(S)

Exemplary embodiment(s) of the invention will be described below with reference to the attached drawings.

1. Overall Arrangement

Figure 1:
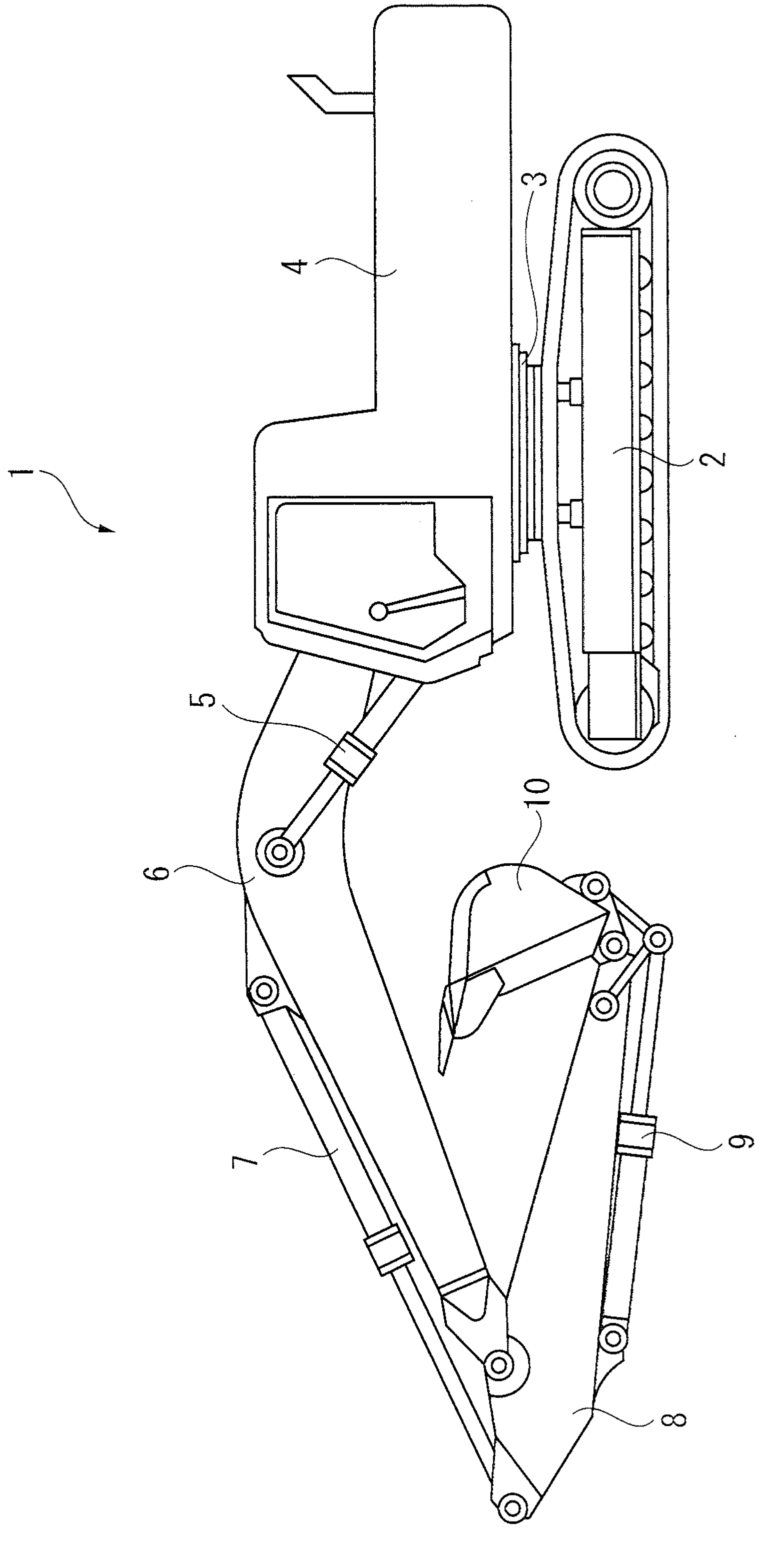
FIG. 1 is a side elevation showing a hybrid construction machine according to an exemplary embodiment of the invention.

As shown in FIG. 1, a hybrid electric rotary excavator 1 according to an exemplary embodiment of the invention is provided with a rotary body 4 mounted on a truck frame of an undercarriage 2 via a swing circle 3. The rotary body 4 is rotated by a later-described electric motor in engagement with the swing circle 3. The rotary body 4 is provided with a boom 6 driven by a boom cylinder 5. An arm 8 driven by an arm cylinder 7 is provided at an end of the boom 6. A bucket 10 driven by a bucket cylinder 9 is provided at an end of the arm 8.

It should be understood that, though the rotary body 4 of the exemplary embodiment is driven by an electric motor, other arrangement is possible in the invention. Specifically, the invention may be applied to a hybrid or electrically driven electric rotary excavator that drives one of the boom 6, the arm 8, the bucket 10 and the undercarriage 2 of the electric rotary excavator 1 by an electric motor. Further, as long as an electric motor is used for at least one of drive systems in the excavator, it is not necessary for the rotary body 4 to be rotated by an electric motor.

Figure 2:
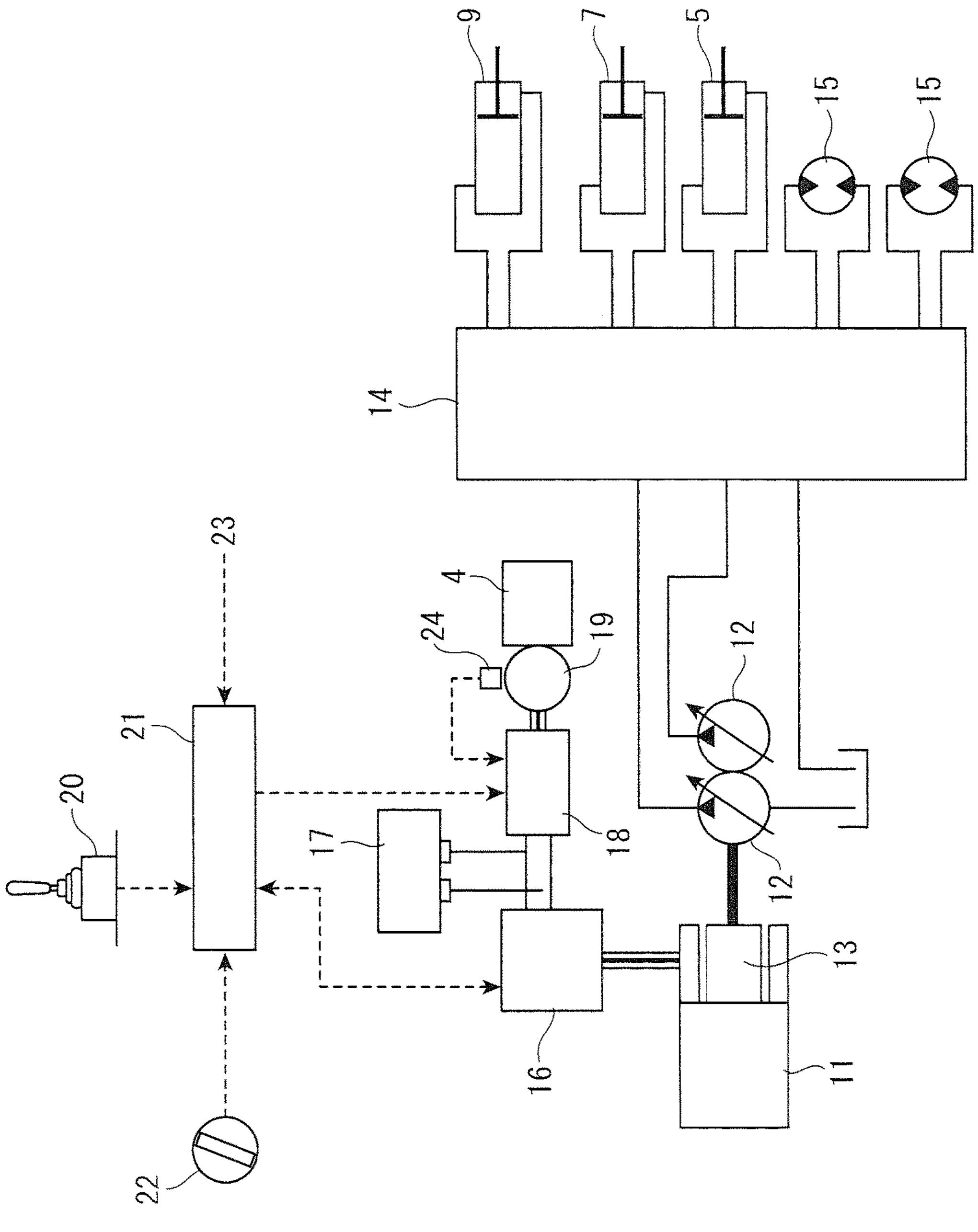
FIG. 2 is a diagram showing an overall arrangement of the hybrid construction machine according to the exemplary embodiment.

FIG. 2 shows an overall arrangement of a drive system of the electric rotary excavator 1.

The electric rotary excavator 1 includes an engine 11 (a drive source), a hydraulic pump 12 and a power-generating motor 13.

The engine 11 drives the hydraulic pump 12 and the power-generator motor 13.

A hydraulic drive system includes a hydraulic control valve 14, the boom cylinder 5, the arm cylinder 7, the bucket cylinder 9 and a running motor 15, which are driven by the hydraulic pump 12 (hydraulic source).

An electric drive system includes an inverter 16, a capacitor 17, a rotation control device 18 and a rotary electric motor 19. The power-generating motor 13, the inverter 16 and the capacitor 17 serves as a power source of the rotary electric motor 19.

These drive systems can be driven by an operator's operation on a control lever 20.

A pump controller (not illustrated in FIG. 2) is provided to the hydraulic drive system. The pump controller generates a control command based on the operation on the control lever 20 to control a swash-plate angle of the hydraulic pump 12.

The electric drive system is provided with the above-described rotation control device 18 and a target speed setting device 21.

The target speed setting device 21 sets a target speed of the rotary body 4 based on a setting of a fuel dial 22, a setting of a mode selection switch 23 and an inclination angle of the control lever 20 (which is generally also used as a work equipment lever for operating the arm 8), and outputs the target speed to the rotation control device 18. The fuel dial 22 is for controlling an amount of fuel to be supplied (injected) to the engine 11. The mode selection switch 23 is for switching between various operation modes. An operator operates the fuel dial 22 and the mode selection switch 23 in accordance with operating conditions of the electric rotary excavator 1.

The above-described rotary electric motor 19 is provided with a rotation speed sensor 24. The rotation speed sensor 24 senses a rotation speed of the rotary electric motor 19. The sensed rotation speed is fed back to the rotation control device 18.

The rotation control device 18 performs speed control by a P control (proportional control) using a speed gain K (control gain) based on the target speed of the rotary body 4 set by the target speed setting device 21 and the rotation speed of the rotary electric motor 19 detected by the rotation speed sensor 18 in order to generate a control command for the rotary electric motor 19. In the exemplary embodiment, the rotation control device 18 constituted as an inverter converts the control command to current and voltage values and outputs the current and voltage values to the rotary electric motor 19, thereby controlling a torque output of the rotary electric motor 19.

Incidentally, the rotation control device 18 is not limited to an inverter but may be any device as long as the device can provide a command for driving the rotary electric motor 19 by switching or the like.

2. Detailed Arrangement of Control Lever 20

Figure 3:
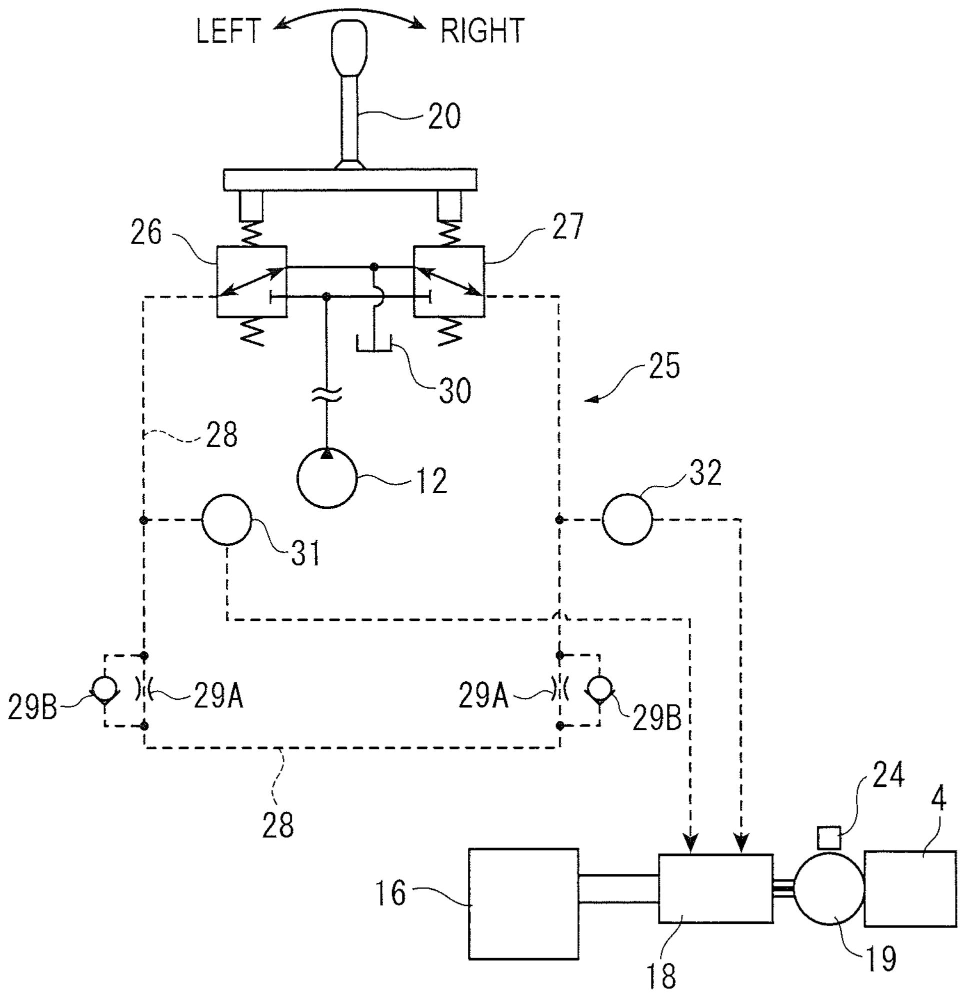
FIG. 3 is a diagram illustrating a rotary drive according to the exemplary embodiment.

As shown in FIG. 3, a pilot circuit 25 is connected to the control lever 20 (control unit of the invention) according to the exemplary embodiment. In the electric drive system, the operation on the control lever 20 is transmitted to the rotation control device 18 via the pilot circuit 25.

The pilot circuit 25 includes the hydraulic pump 12 (hydraulic source), a left pilot valve 26, a right pilot valve 27, a pipe line 28, throttle valves 29A, check valves 29B, a reservoir 30, a left pressure sensor 31 and a right pressure sensor 32. The voltage signals detected by the left pressure sensor 31 and the right pressure sensor 32 are inputted to the rotation control device 18. A pilot pump is provided to the above-described hydraulic pump 12. The pilot pump applies a pilot pressure to either a left part or a right part of the pipe line 28 in accordance with the operating condition of the left pilot valve 26 and the right pilot valve 27. It should be understood that, though the hydraulic pump 12 serves as a pilot pump (hydraulic source) of the pilot circuit 25 in this exemplary embodiment, a pilot pump independent of the hydraulic pump 12 may be provided as a hydraulic source.

Further, it should be noted that the throttle valve 29A and the check valve 29B are provided on each of the left and right parts of the pipe line 28 at positions at which pipe losses due to the diameter, length and curve of the pipe of the left-part and right-part pipes of the pipe line 28 become equal starting from the pilot valves 26 and 27 in order to equalize the right and left hydraulic line resistances.

Figure 4:
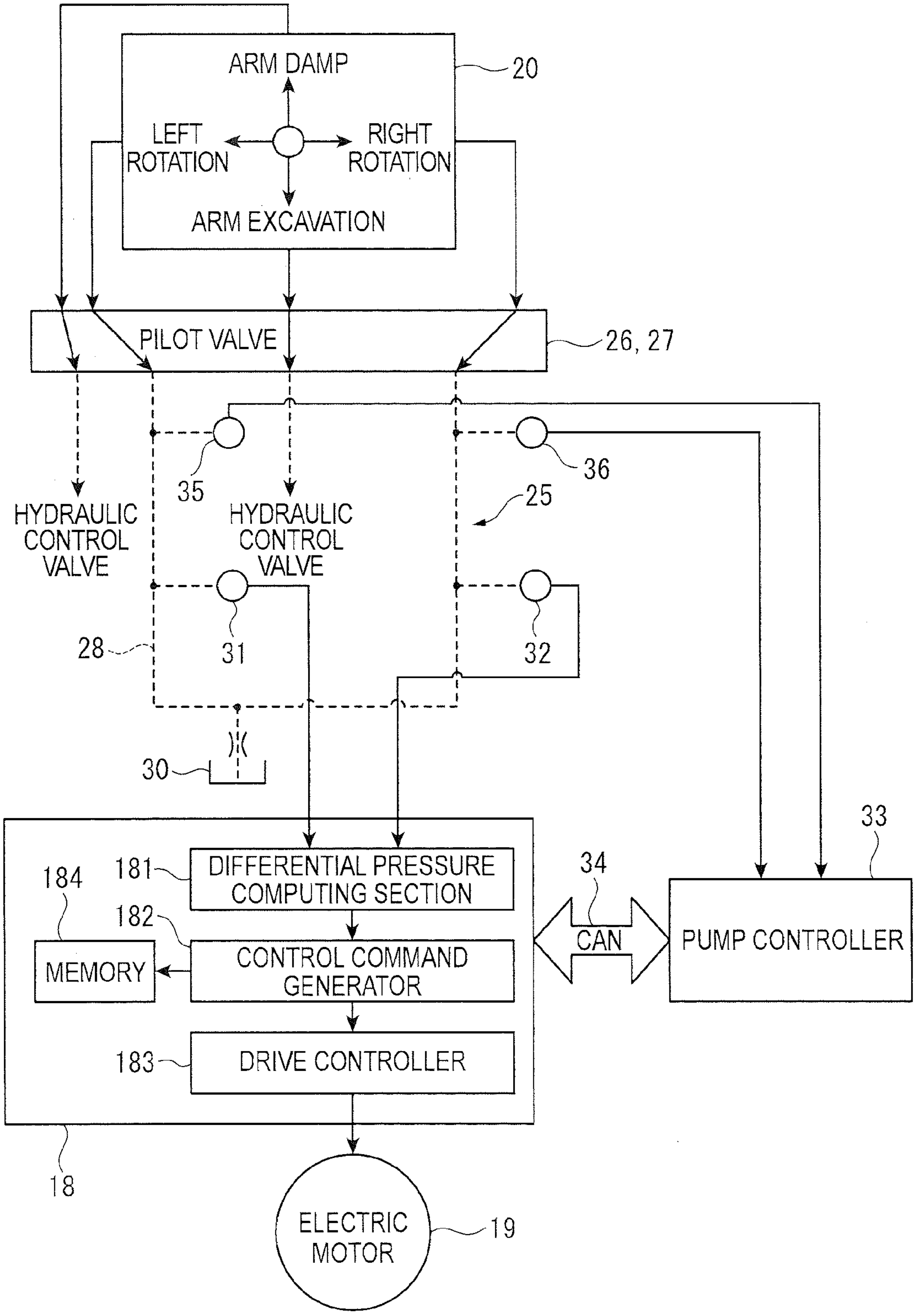
FIG. 4 is a block diagram showing a control structure of a rotary control device according to the exemplary embodiment.

Further, though an upper pipe line connecting the pilot valves 26 and 27 is directly guided to the reservoir 30 in FIG. 3, a throttle valve may be provided on an upstream of the reservoir 30 as shown in FIG. 4.

The left pilot valve 26 and the right pilot valve 27 are connected to a lower part of the control lever 20. For instance, when the control lever 20 is operated leftward, the left pilot valve 26 is pushed downward against the spring provided at a lower side, so that the pipe line is switched to feed pressure oil discharged from the pilot pump to the left part of the pipe line 28. The fed pressure oil is drained from the reservoir 30 via the throttle valve 29A on the left part of the pipe line 28 and the check valve 29B on the right part of the pipe line 28. Since a pilot pressure is generated on the left part of the pipe line 28 due to the feeding of the pressure oil and the oil flows on the right part of the pipe line 28 via the throttle valve 29A and the check valve 29B, a back pressure is generated on the right part of the pipe line 28.

On the other hand, when the control lever 20 is operated rightward, the right pilot valve 27 is also pushed downward to switch the pipe line, so that the pressure oil is fed to the right part of the pipe line 28. The fed pressure oil is drained from the reservoir 30 via the throttle valve 29A on the right part of the pipe line 28 and the check valve 29B on the left part of the pipe line 28. The pilot pressure is generated on the right part of the pipe line 28 and the back pressure is generated on the left part of the pipe line 28.

In other words, the pipe line 28 defines a closed circuit from the left pilot valve 26 to the right pilot valve 27, in which the pressure condition of the left part and right part of the pipe line 28 changes in accordance with switching condition of the pilot valves 26 and 27.

The left pressure sensor 31 detects the pressure on the left part of the pipe line 28 and outputs the pressure in a form of voltage signals to the rotation control device 18. The right pressure sensor 32 detects the pressure on the right part of the pipe line 28 and outputs the pressure in a form of voltage signals to the rotation control device 18.

These pressure sensors 31 and 32 may be provided by any known pressure sensor having a diaphragm, in which deformation of the diaphragm may be converted into electric signals with the use of a device including a strain gauge, electrostatic sensor, potentiometer and the like.

In the pilot circuit 25, when an operator operates the control lever 20 in a left-turn direction, the left pilot valve 26 is pushed down in accordance with an inclination of the control lever 20. Then, in accordance with the push-down amount, pressure oil is fed from the pilot pump to the pipe line 28 and is partially drained from the right pilot valve 27 through the right part of the pipe line 28 to the reservoir 30. At this time, the left pressure sensor 31 and the right pressure sensor 32 convert the detected pressure values into voltage signals and output to the rotation control device 18.

3. Structure of Rotation Control Device 18

FIG. 4 is a block diagram showing details of the rotation control device 18 of the control device of an electric actuator according to the exemplary embodiment. The rotation control device 18 is in communication with a pump controller 33 for controlling a hydraulic drive system via a CAN (Controller Area Network) line 34.

A left pressure sensor 35 and a right pressure sensor 36 independent of the above-mentioned pressure sensors 31 and 32 are provided in the pilot circuit 25 for transmitting the operation on the control lever 20. The pressure values detected by the pressure sensors 35 and 36 are outputted to the pump controller 33 in a form of voltage signals. This is because it is necessary for the pump controller 33 to control the drive of the pilot pump in order to control the hydraulic pressure in the pilot circuit 25.

Then, the pressure values outputted to the pump controller 33 are also outputted to the rotation control device 18 via the CAN line 34.

The rotation control device 18 includes a differential pressure computing section 181, a control command generator 182, a drive controller 183 and a memory 184.

The differential pressure computing section 181 converts the voltage signals from the left pressure sensor 31 and the right pressure sensor 32 into pressure values and calculates a differential pressure between the right and left parts of the pipe line 28. It should be understood that, though a voltage-to-pressure value conversion is performed in this exemplary embodiment in order to process the signals and data of the electric drive system in the same manner as the signals and data of the hydraulic drive system, the difference may be calculated based solely on the voltage signals.

Further, when one of the left pressure sensor 31 and the right pressure sensor 32 is out of order, the differential pressure computing section 181 calculates the differential pressure based on the voltage signals inputted from the pump controller 33 via the above-described CAN line 34.

The differential pressure calculated by the differential pressure computing section 181 is outputted to the control command generator 182.

The control command generator 182 generates a control command to be outputted to the rotary electric motor 19 based on the calculated differential pressure. Though described in detail below, the control command generator 182 generates the control command by converting the differential pressure into a operation amount of the control lever 20 using a map stored in the memory 184, which is further converted into a rotation speed control command.

The control command generated by the control command generator 182 is outputted to the drive controller 183.

The drive controller 183 converts the generated control command into current and voltage values and outputs the current and voltage values to the rotary electric motor 19, thereby controlling a torque output of the rotary electric motor 19.

4. Operation of Rotation Control Device 18

Figure 5:
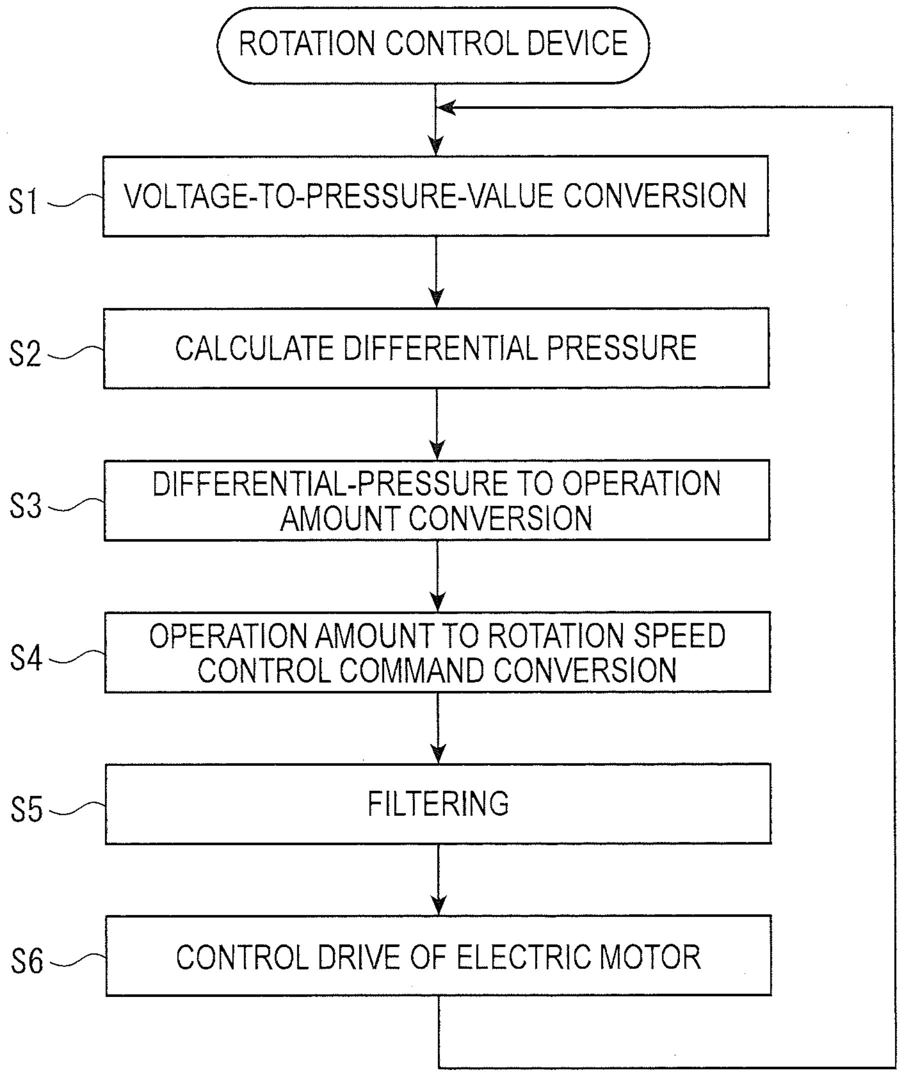
FIG. 5 is a flowchart showing an operation of the rotary control device according to the exemplary embodiment.

An operation of the rotation control device 18 will be described below with reference to the flowchart in FIG. 5.

The differential pressure computing section 181 converts the voltage signals from the left pressure sensor 31 and the right pressure sensor 32 into pressure values (Step S1).

Next, the differential pressure computing section 181 calculates the differential pressure between right and left parts of the pipe line 28 based on the converted pressure values and outputs the calculated results to the control command generator 182 (Step S2).

The judgment whether the control lever 20 is turned right or left is made by, for instance, subtracting the voltage signal of the left pressure sensor 31 from the voltage signal of the right pressure sensor 32, where it is judged that the control lever 20 is turned right when the calculation results are positive while it is judged that the control lever 20 is turned left when the calculation results are negative.

Incidentally, before calculating the differential pressure in Step S2, a malfunction test for determining whether the left pressure sensor 31 and the right pressure sensor 32 indicate a normal range is performed. In addition, another malfunction test for determining whether the difference between the voltage signals of the right pressure sensor 32 and the right pressure sensor 36 or the difference between the voltage signals of the left pressure sensor 31 and the left pressure sensor 35 indicates a large difference (i.e. a value equal to or larger than a threshold for normal range) is performed.

The difference herein refers to an absolute value of the result of subtraction between the right and left pressure values. It should be understood that the subtraction between the voltage signals outputted by the respective pressure sensors 31 and 32 may be performed and the results of the subtraction may be converted into pressure values without subtraction between the right and left pressure values.

The control command generator 182 converts the calculated differential pressure into a operation amount of the control lever 20 (Step S3).

Figure 6A:
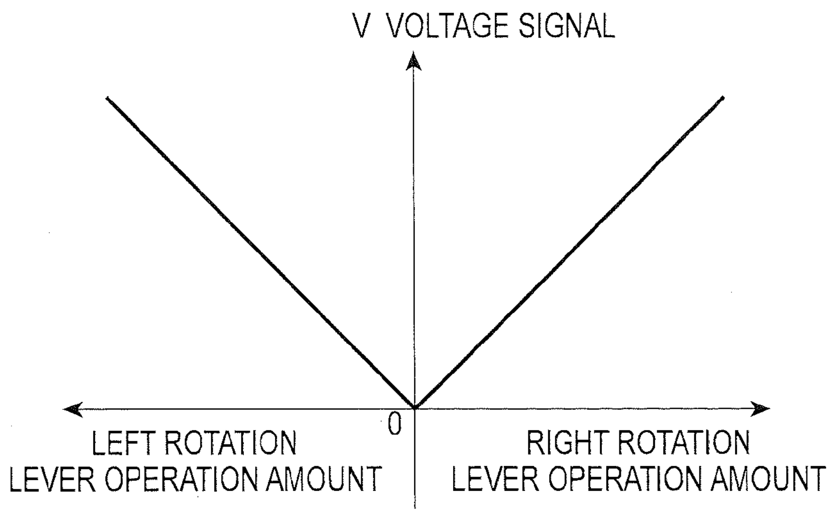
FIG. 6A is a graph showing a relationship between a differential pressure and a lever operation amount according to the exemplary embodiment.

Specifically, as shown in FIG. 6A, the voltage signal outputted from the pressure sensors 31 and 32 substantially linearly increases as the operation amount (inclination amount) of the control lever 20 increases in right or left direction.

Figure 6B:
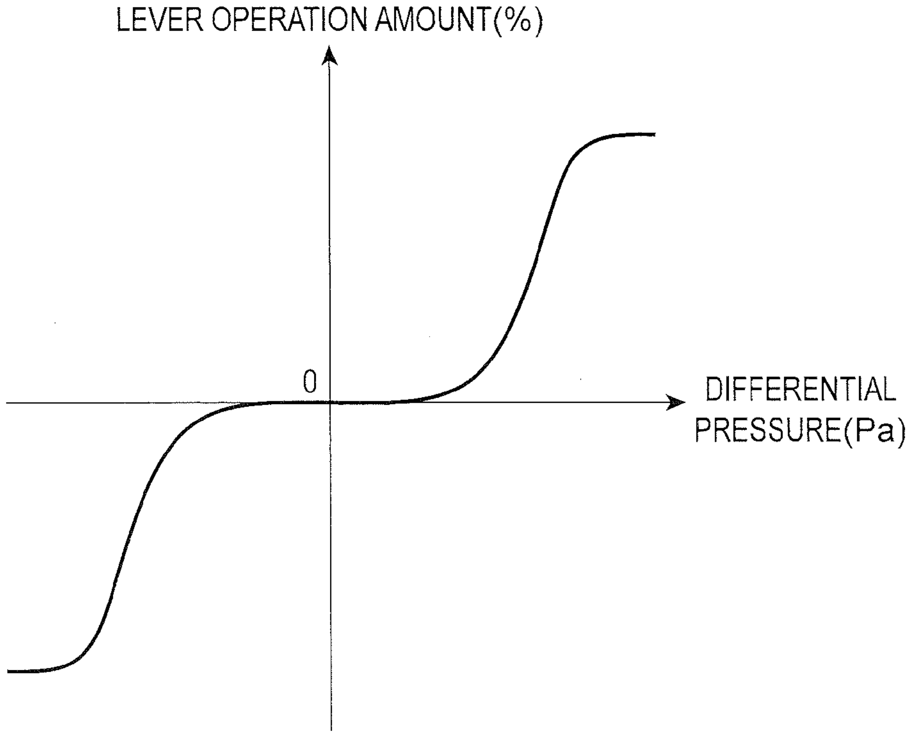
FIG. 6B is another graph showing a relationship between a differential pressure and a lever operation amount according to the exemplary embodiment.

Thus, with reference to the map stored in the memory 184 in which the differential pressure and the lever operation amount are associated as shown in FIG. 6B, the differential pressure computing section 181 converts the differential pressure into the operation amount of the control lever 20.

Next, the control command generator 182 converts the converted lever operation amount into the rotation speed control command and outputs the rotation speed control command to the drive controller 183 (Step S4).

The drive controller 183 filters the rotation speed control command by, for instance, an LPF (Step S5) and, subsequently, converts the rotation speed control command into current and voltage values to control the torque output of the rotary electric motor 19 (Step S6). It should be understood that the filtering may be performed with the use of a filter other than an LPF or may not be performed.

5. Rotation by Conventional Hydraulically Driven Rotary Device

A rotation hydraulic circuit of a conventional hydraulically driven rotary device will be described below with reference to FIG. 7.

An engine 101 drives a hydraulic pump 102 and a pilot pump 103.

The hydraulic pump 102 is connected to a flow control valve 105 via a delivery line 104. The flow control valve 105 is connected to a hydraulic rotary motor 107 via rotation drive lines 106A and 106B.

A control lever 108 is connected to pilot valves 109 and 110. The pilot valves 109 and 110 are connected to the pilot pump 103 via a pipe line 111A. It should be understood that, though the hydraulic pump 102 and the pilot pump are separately provided in this conventional hydraulically driven rotary device, the hydraulic pump 102 itself may serve as a hydraulic source.

The pilot valve 109 is connected to an operating portion 105B of the flow control valve 105 via a pilot line 112A. The pilot valve 110 is connected with the operating portion 105B of the flow control valve 105 via a pilot line 113A.

The hydraulic pump 102 is provided with a servo mechanism for controlling a swash-plate angle.

The servo mechanism is provided by a servo piston 114 and a control valve 115. An end of the control valve 115 is connected with a pipe line 116A branched from a delivery line 104 of the hydraulic pump 102. The other end of the control valve 115 is connected with downstream lines 117A and 117B of the flow control valve 105.

The swash-plate angle of the hydraulic pump 102 is adjusted by a differential pressure between the discharge pressure P1 of the hydraulic pump 102 introduced through the pipe line 116A branched from the delivery line 104 of the hydraulic pump 102 and a load pressure LP1 introduced through a pipe line 118 joined with the downstream lines 117A and 117B.

Specifically, when P1>LP1, the control valve 115 is switched to a b-position. Accordingly, the pilot pressure from the pilot pump 103 flows into a b-chamber of the servo piston 114 and the pilot pressure in an a-chamber is drained to a reservoir, so that the servo piston 114 is displaced rightward to reduce the swash-plate angle of the hydraulic pump 102.

On the other hand, when P1<LP1, the control valve 115 is switched to an a-position. Accordingly, the pilot pressure from the pilot pump 103 flows into the a-chamber of the servo piston 114 and the pilot pressure in the b-chamber is drained to the reservoir, so that the servo piston 114 is displaced leftward to increase the swash-plate angle of the hydraulic pump 102.

An intake valve 120A is disposed in a pipe line 119A branched from the rotation drive line 106A. Further, an intake valve 120B is disposed in a pipe line 119B branched from the rotation drive line 106B. These intake valves 120A and 120B are connected with a reservoir 121. The intake valves 120A and 120B suck oil from the reservoir 121 so that one of the rotation drive lines 106A and 106B is not vacuated while the hydraulic rotary motor 107 is in suspension.

Further, a relief valve 123B is disposed in a pipe line 122A branched from the rotation drive line 106A.

In addition, a relief valve 123B is disposed in a pipe line 122B branched from the rotation drive line 106B. These relief valves 123A and 123B are connected with the reservoir 121.

The relief valves 123A and 123B relieve a high pressure generated inside the rotation drive lines 106A and 106B during actuation, acceleration and the like of the hydraulic rotary motor 107 and drains the pressure into the reservoir 121, thereby preventing the damage on the hydraulic rotary motor 107.

A rotary drive by the hydraulic rotary motor 107 is performed as follows.

When the control lever 108 is inclined to a left-turn side, the pilot valve 110 is pushed down against a spring force to bring an input port of the pilot valve 110 in communication with the pipe line 111A, so that the pilot hydraulic pressure is introduced into the pilot line 113A. The pilot hydraulic pressure introduced to the pilot line 113A acts on the operating portion 105B so that the flow control valve 105 is switched to the b-position.

The pressure oil discharged from the hydraulic pump 102 flows into the hydraulic rotary motor 107 via the rotation drive line 106B to turn the hydraulic rotary motor 107 leftward.

When the flow control valve 105 is switched to the b-position, the oil in the pilot line 112A is drained to the reservoir via the pilot valve 109. At this time, a back pressure is generated in the pilot line 112A in accordance with the oil flow. Thus, the pressure actually acting on the flow control valve 105 is not the pilot pressure in the pilot line 113A but is a pressure obtained by subtracting the back pressure in the pilot line 112A from the pilot pressure in the pilot line 113A.

6. Advantages of Embodiment(s)

Figure 7:
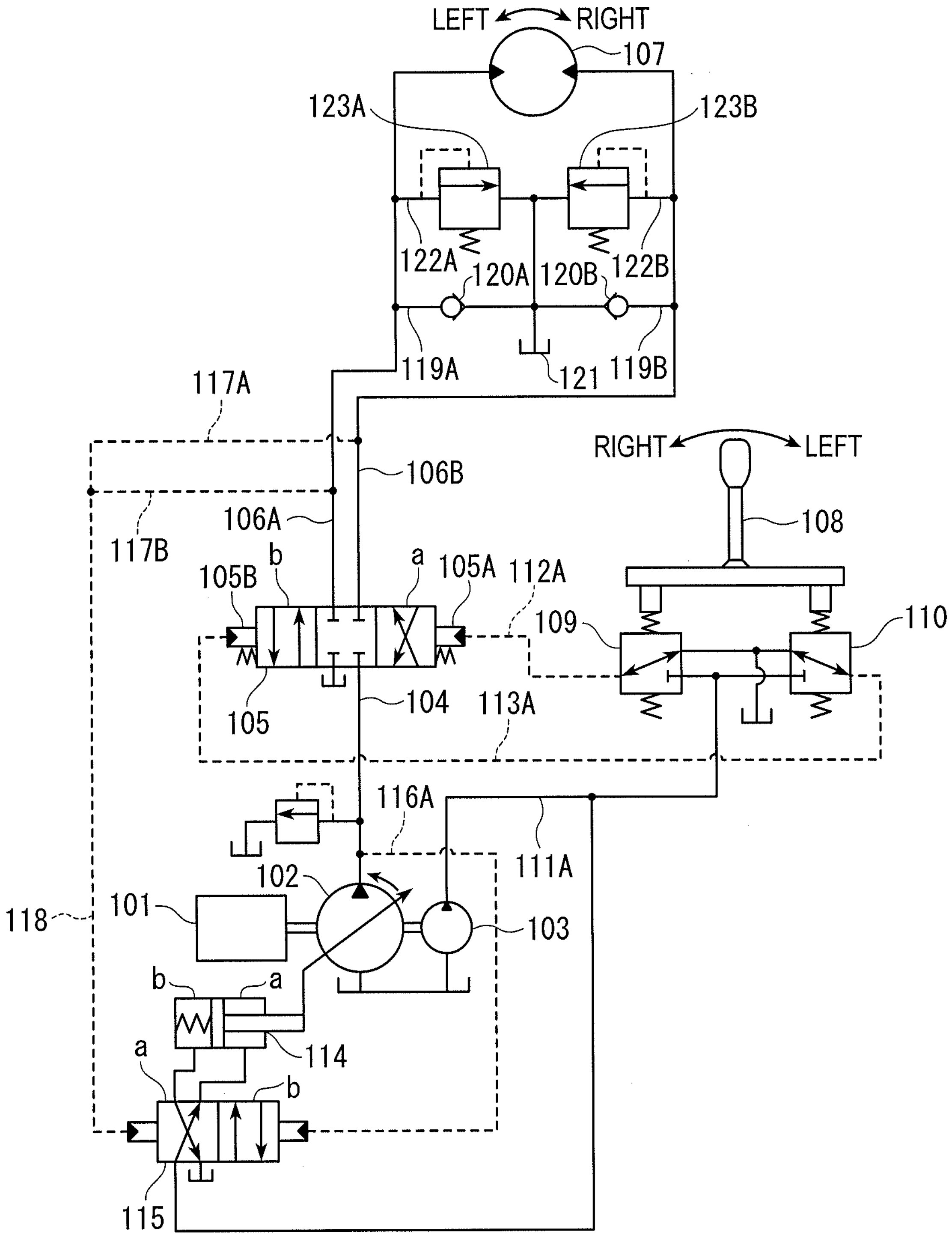
FIG. 7 RELATED ART
FIG. 7 is a diagram illustrating a conventional hydraulic rotary drive.

In the conventional hydraulically driven rotary device shown in FIG. 7, as described above, even when a pilot pressure is applied on the flow control valve 105 by inclining the control lever 108, since an opposite back pressure acts on the flow control valve 105, only a pressure equal to a difference between the pilot pressure and the back pressure is applied on the flow control valve 105.

In the exemplary embodiment, as shown in FIGS. 3 and 4, the control command to the rotary electric motor 19 is generated based on the difference between the pilot pressures on the right and left parts of the pilot circuit 25. Accordingly, the rotary electric motor 19 can be driven in a pilot-pressure balance similar to that in the conventional hydraulically driven rotary device. Thus, an operator being accustomed to the conventional hydraulically driven rotary device does not feel uncomfortable for operation.

Further, viscosity of oil in the pilot circuit increases in a low temperature environment. Thus, in the conventional hydraulically driven rotary device, even when the control lever 108 is greatly inclined, the displacement of the flow control valve 105 is reduced and consequently the rotation speed of the hydraulic rotary motor 107 is not so increased. In other words, the rotary movement becomes slow in a low temperature environment.

With the use of the rotation control device 18 of the exemplary embodiment, an operation feeling similar to that of the conventional hydraulically driven rotary device can be obtained also in a low temperature environment.

The invention claimed is:

1. Hybrid work equipment comprising:

an electric actuator that is adapted to perform a forward-reverse movement;

a control unit that is adapted to be operated by an operator in a forward direction or a reverse direction to drive the electric actuator;

a pilot circuit that is connected with the control unit, the pilot circuit being configured to generate a forward pilot pressure or a reverse pilot pressure in accordance with the forward operation or the reverse operation of the control unit; and a control device configured to receive the forward pilot pressure and the reverse pilot pressure generated by the pilot circuit and to output a drive command to the electric actuator, the forward-reverse movement of the electric actuator being commanded by the drive command, wherein the control device comprises:

a differential pressure acquiring unit that is configured to acquire a differential pressure between a pilot pressure of the pilot circuit corresponding to the operation direction of the control unit and a pilot pressure of the pilot circuit in a direction opposite to the operation direction;

a control command generator that is configured to generate a control command to the electric actuator based on the differential pressure of the pilot circuit acquired by the differential pressure acquiring unit; and a drive controller that is configured to control a drive of the electric actuator based on the control command generated by the control command generator.

2. The hybrid work equipment according to claim 1, wherein the differential pressure acquiring unit comprises:

a forward pressure detector that is configured to detect the forward pilot pressure of the pilot circuit;

a reverse pressure detector that is configured to detect the reverse pilot pressure of the pilot circuit; and a differential pressure calculating section that is configured to calculate a differential pressure between the forward pilot pressure detected by the forward pressure detector and the reverse pilot pressure detected by the reverse pressure detector.

3. The hybrid work equipment according to claim 1, wherein the pilot circuit comprises:

a first pilot valve connected to the control unit and configured to be operated based on the control unit being operated in the forward direction;

a second pilot valve connected to the control unit and configured to be operated based on the control unit being operated in the reverse direction; and a pipe line defining a closed circuit from the first pilot valve to the second pilot valve in which a pressure oil flows.

4. The hybrid work equipment according to claim 1, wherein the differential pressure acquiring unit is configured to judge, based on the differential pressure being positive, that the control unit is operated in the forward direction and to judge, based on the differential pressure being negative, that the control unit is operated in the reverse direction.

5. The hybrid work equipment according to claim 1, wherein the electric actuator is configured to electrically drive a drive system of the hybrid work equipment.

* * * * *